United States Patent
Wittern, III et al.

(10) Patent No.: US 10,402,804 B1
(45) Date of Patent: Sep. 3, 2019

(54) APPARATUS, SYSTEM AND METHOD OF OBTAINING ITEMS FROM A VENDING MACHINE WITH AN ELECTRONIC BENEFITS TRANSFER CARD

(71) Applicant: Fawn Engineering Corporation, Des Moines, IA (US)

(72) Inventors: Francis A. Wittern, III, Des Moines, IA (US); John Van Horn, Des Moines, IA (US)

(73) Assignee: Fawn Engineering Corporation, Des Moines, IA (US)

( * ) Notice: Subject to any disclaimer, the term of this patent is extended or adjusted under 35 U.S.C. 154(b) by 346 days.

(21) Appl. No.: 14/849,410

(22) Filed: Sep. 9, 2015

(51) Int. Cl.
| | |
|---|---|
| G07F 7/08 | (2006.01) |
| G07F 7/10 | (2006.01) |
| G06Q 20/18 | (2012.01) |
| G06Q 20/20 | (2012.01) |
| G06Q 30/06 | (2012.01) |
| G07F 11/00 | (2006.01) |

(52) U.S. Cl.
CPC .......... *G06Q 20/18* (2013.01); *G06Q 20/204* (2013.01); *G06Q 20/206* (2013.01); *G06Q 30/0607* (2013.01); *G07F 7/10* (2013.01); *G07F 11/00* (2013.01); *G07F 7/08* (2013.01)

(58) Field of Classification Search
None
See application file for complete search history.

(56) References Cited

U.S. PATENT DOCUMENTS

| | | | |
|---|---|---|---|
| 4,893,705 A * | 1/1990 | Brown | G07F 7/069 |
| | | | 194/211 |
| 7,627,523 B1 | 12/2009 | Symonds et al. | |
| 7,774,273 B2 | 8/2010 | Neal et al. | |
| 7,810,721 B2 | 10/2010 | Powell et al. | |
| 7,991,507 B2 | 8/2011 | Liff et al. | |
| 8,204,828 B1 | 6/2012 | Kuite et al. | |
| 8,447,669 B2 | 5/2013 | Antoo et al. | |
| 2002/0153414 A1* | 10/2002 | Stoutenburg | G06Q 20/04 |
| | | | 235/380 |
| 2002/0156727 A1 | 10/2002 | LeVake et al. | |
| 2004/0133653 A1* | 7/2004 | Defosse | G06Q 20/04 |
| | | | 709/217 |
| 2004/0210486 A1 | 10/2004 | Carapelli | |
| 2005/0211768 A1* | 9/2005 | Stillman | G07F 11/00 |
| | | | 235/381 |
| 2006/0106490 A1 | 5/2006 | Howell et al. | |
| 2006/0149626 A1* | 7/2006 | Bennett | G06Q 30/02 |
| | | | 705/14.1 |

(Continued)

OTHER PUBLICATIONS

MP 40 Snack Merchandiser Product Specification Sheet, Fawn Vendors at least as early as Sep. 9, 2014, 2 pages.

(Continued)

*Primary Examiner* — Allen C Chein
(74) *Attorney, Agent, or Firm* — McKee, Voorhees & Sease, PLC

(57) ABSTRACT

A means and method to utilize government-issued food stamp credit to purchase items from a vending machine. The food stamp credit is to be received through a monetary device and validated through the vending machine control network. The network will validate the transaction and allow or limit the type of purchases based on information collected from the food stamp government program rules and regulations. The invention is applicable to any electronic benefit transfer (EBT) type program or analogous transactions.

15 Claims, 7 Drawing Sheets

(56) References Cited

U.S. PATENT DOCUMENTS

| | | |
|---|---|---|
| 2008/0086417 A1 | 4/2008 | Bykov et al. |
| 2010/0114749 A1 | 5/2010 | Burras et al. |
| 2012/0226565 A1 | 9/2012 | Drozd |
| 2013/0232081 A1* | 9/2013 | Antoo ............... G06Q 20/10 705/44 |
| 2013/0253700 A1 | 9/2013 | Carson et al. |
| 2013/0339165 A1* | 12/2013 | Calman ............. G06Q 30/06 705/16 |

OTHER PUBLICATIONS

"Electronic Benefit Transfer", Wikipedia Article [online], [Retrieved on Aug. 21, 2013], retrieved from the Internet:<URL: http:/en.wikipedia.org/wiki/Electronic_Benefit_Transfer>, 3 Pages.

"Electronic Benefit Transfer", Summary Sheet, foodstamps.org, (c) 2013, 1 page.

"The Food and Nutrition Act (As Amended Through P.L. 110-246, Effective Oct. 1, 2008)", United States Department of Agriculture, 29 pages.

"Supplemental Nutrition Assistance Program last modified Jul. 25, 2013", United States Department of Agriculture, 5 pages.

"SNAP the Supplemental Nutrition Assistance Program: Training Guide for Retailers", United States Department of Agriculture, 16 pages, FNS-330, Revised May 2012.

"Electronic Disbursement Options White Paper Version 1.0",NACHA-The Electronic Payments Association, 23 pages, Nov. 2003.

Quinones, Ana R. et. al, "From Paper to Plastic by 2002", 20 pages Aug. 2000.

"Quest: Are you a Quest State?", Summary Sheet, NACHA, (c) 2013, 1 page.

* cited by examiner

DATABASE: INFORMATION CARRIED ON EBT card (or available from Food Stamp Database)

| Household/Cardholder Name | Card # | Balance of Household Account | State | Address |
|---|---|---|---|---|
| John S. Doe family | 4607815467 | $130.27 | TX | 123 3rd St., Amarillo |

FIG. 4A

DATABASE: FOOD STAMP SYSTEM MASTER DATABASE OF ALL SNAP EBT card holders

| Household/Cardholder Name | Card # | Balance of Household Account | PIN | State | Address |
|---|---|---|---|---|---|
| John S. Doe family | 4607815467 | $130.27 | *&4%1ab | TX | 123 3rd St., Amarillo |
| Jane W. Johnson family | 6500014124 | $49.00 | SNAP123 | MN | 4589 Elm, Hibbing |
| XXXXX family | 9873948798 | $677.02 | %46948 | MN | 323 Main St., Minneapolis |
| YYYYY family | 1138793482 | $0.00 | YYYY#@!! | NY | 145689 172nd Ave., Brooklyn |
| ZZZZZ family | 1898789879 | $34.30 | Mich4978 | MI | 345 S. 22nd St, Grand Rapids |
| . | . | . | . | . | . |

FIG. 4B

DATABASE: PRODUCTS ELIGIBLE FOR PURCHASE WITH SNAP EBT CARD

| UBC Product Code | Food Item |
|---|---|
| 4332498273897248972 | Skim Milk |
| 5489828973842798777 | Canned Green Beans |
| 3298792348798729492 | Bread |
| 8987987982798739 4287987 | Peanut Butter |
| 2897823749879879 28798 | Jelly |
| 8972387928740987 24039870 | Spaghetti |
| . | . |
| . | . |
| . | . |

FIG. 4C

APPARATUS, SYSTEM AND METHOD OF OBTAINING ITEMS FROM A VENDING MACHINE WITH AN ELECTRONIC BENEFITS TRANSFER CARD

CROSS-REFERENCE TO RELATED APPLICATIONS

This application claims priority to and the benefit of Provisional Application U.S. Ser. No. 62/048,083 filed on Sep. 9, 2014, which is incorporated by reference herein in its entirety.

BACKGROUND OF THE INVENTION

A. Field

The present invention relates to vending machines and, in particular, to vending items from vending machines using government-issued food stamp credit instead of money or a bank-issued credit/debit cards, or analogous electronic benefit transfer (EBT) or other types of cards/programs.

B. State of the Art

Legislation changed how government-issued food stamps or assistance is/are provided and used. Food stamp or similar programs are typically at least substantially funded by the federal government. Federal statutes, and rules and regulations implementing them, increasingly require what is called an electronic benefit transfer (EBT) card to be used instead of paper food stamps. The monthly benefit to a user (an individual or household) is placed in a government-controlled bank account. The EBT card allows the user to utilize the EBT card like a debit card at authorized food retail outlets. The retail outlets have to be approved through a licensing procedure with the government agency administrating the benefit program. Licensing involves a food seller to agree to follow the program regulations. Those regulations include policing against purchase of ineligible products. For example, use of food stamp credit may exclude certain foods or food products. Examples include most products that contain alcohol, nutritional supplements, food purchased for on-premises consumption, pet food, and others. The burden falls upon the food vendor to police this, with certain legal penalties if violations are shown. Food vendors must also comply with regulations regarding appropriate readers of the EBT cards. Each state administers its own food stamp program (supplemental nutrition assistance program or "SNAP") by contracting with an electronic funds transfer (EFT) private third party. However, the law encourages what it calls interoperability meaning that all states utilize systems that can process EBT cards from any other state to allow use of EBT cards across the country.

Issues have been identified with regard to EBT cards. Because they essentially function as debit cards, it can be difficult to sort out and police what is eligible (under the particular benefits program associated with the card) for purchase with the EBT card, and what actually is purchased. While the cardholder has some responsibility on this point, as discussed above, at least some benefits program, under potential penalty, put responsibility on the vendor of the products. This can be difficult when an EBT card is used.

Another issue is privacy on the part of the EBT card holder. Part of the EBT card idea is that its use is less noticeable to bystanders, which reduces the onus some give to benefits program participants. But, as indicated above, this can make it more difficult to achieve compliance with the benefits program rules.

Another issue with the vendor is how to document both compliance with benefits program rules and inventory control regarding benefits program eligible products. For example, it could be helpful to a vendor to have better ways to show its procedures promote compliance with the benefits program rules. In some cases, it could be helpful for the vendor to keep close track on eligible product sales for purposes of stocking and tracking inventory and sales.

Thus, room for improvement in the handling of EBT-type transactions have been identified by the inventors.

Vending machines can handle a wide variety of vendible products (food and non-food). Conventionally food-related vending machines themselves can be loaded with a wide variety of different types of food items. While some machines provide such things as sandwiches, fruit, and vegetables as selections, other machines have what are frequently referred to as snacks (e.g. candy, gum, chips, and the like). An example of a snack vending machine is the Model MP40 Snack Merchandiser. This MP40 snack merchandiser, commercially available from Fawn Vending of Clive, Iowa, U.S.A., includes a visual display, a user interface keyboard for user entry of codes and data, and a bill/coin validator/acceptor. This machine also can be configured to include a credit or debit card reader. If the latter is installed, the machine also has a subsystem to communicate out to the appropriate card-issuing authority or processor to validate a credit or debit transaction. Vending machines typically include what is called a vending machine control board or vending machine controller ("VMC") which is basically a programmable processor that can receive information regarding product selection and method of payment, validate the same, and then control dispensing of any product or products validated for vending by control of the appropriate dispenser(s) in the vending machine.

Vending machines are typically programmed according to a convention whereby different products are selectable through the user interface keyboard based on their row and column location in the machine. The vending machine operator coordinates inventory, sets the pricing, and otherwise sets the vending machine up to coordinate the different products to the different selectable row and column locations as well as the pricing. Examples of how this type of vending machine and vending machine controller accomplishes both internal functions and external communication (such as to what will be called vending machine networks—remote computers or servers that monitor operation of a plurality of vending machines for a given vending machine owner or operator or third party credit and debit card issuers or processors, and the like) can be seen at patent filings U.S. 2002/0156727; U.S. 2006/0106490; and U.S. Pat. No. 7,810,721, each of which is incorporated by reference herein.

Techniques have been developed, and are rather mature, in the vending machine field of tracking inventory, machine-by-machine, and allowing not only cash but card (debit/credit) purchases. While the latter adds convenience to consumers (who increasingly rely on credit/debit cards instead of cash as the preferred mode of payment), the latter and the former are beneficial to the vending machine operator. Being able to check on current machine inventory remotely allows an operator to better plan re-stocking trips. Some operators own or manage many vending machines. Savings in travel and labor can be substantial. But also, increasing card payment reduces labor and time of collecting bills/coins, restocking coins for change, and the like. It also expands the types of vendible products and the ability to market to consumers multiple or combination purchases each visit. Thus, the industry has put considerable focus on efficiencies for the owner/operator of vending machines, including sets of sometimes widely-dispersed vending machines. Because many food stamp or assistance transactions have changed from paper stamps to a machine-readable card (e.g. a plastic card with magnetic strip like credit or debit cards), many retailers (e.g. grocery stores, convenience stores, department stores) have had to adapt their point-of-purchase check out machines or registers to accept EBT cards. As discussed earlier, the food stamp or EBT card would be used like a debit card. A certain amount of value or credit is linked to the food stamp card. Each purchase by the user would subtract the value of the purchase from the amount of available value or credit. Most EBT card transactions are accomplished with what are called point of sale or "POS" machines that handle debit or credit cards at retail establishments. Examples of such processing configurations can be seen at U.S. Pat. No. 7,627,523 and U.S. 2008/0086417 which are incorporated by reference herein. A few other examples of attempts to utilize EBT cards in processing consumer purchases are, for example, U.S. Pat. Nos. 7,774,273; 8,204,828; 8,447,669; and U.S. 2010/0114749, incorporated by reference herein. But, again, the direction of the industry is to adapt the POS registers to treat the EBT card like a debit card, which does not address some of the issues identified above. An intended benefit is to make the EBT purchase less overt. Compliance burden on the vendor remains a difficulty.

SNAP (Supplemental Nutrition Assistance Program) is an example of a food-stamp-type or EBT program. It provides eligible persons with a monthly value to purchase eligible or authorized types of food for their personal household use. It is a government-sponsored (U.S. Department of Agriculture) benefit program.

Therefore, as can be seen, a number of factors are at play with EBT programs. Some relate to the EBT card holder. Some relate to the vendor of products to the EBT card holder. Some are subtle. For example, take the goal of making the transactions less noticeable by treating it more like a debit card. But they can be antagonistic with one another. Treating it more like a debit card can make it more difficult for the vendor to comply with its burden of staying within the program rules. Thus, addressing just one of the factors involved with EBT programs may be detrimental, or even in violation, of another relevant factor or requirement under such program.

Although EBT programs have existed for some time and the vending machine industry is decades-old, issues regarding food-stamp-type program goals, rules and regulations have not been adequately addressed. Similar issues exist for other EBT or analogous programs.

For example, in the case of a food stamp type program like SNAP, how can both SNAP eligible and SNAP ineligible items be conveniently offered to consumers? How can whether or not a consumer selection meets current SNAP regulations be better policed? Again, assuming the vendor is approved and licensed under the SNAP regulations, that entity bears a substantial policing obligation under risk of substantial legal penalties for violation. Similar issues exist for other EBT or analogous programs.

SUMMARY OF THE INVENTION

It is therefore a principle object, feature, aspect, or advantage of the invention to improve over or solve problems or deficiencies in the current state of the art.

Other objects, features, aspects, or advantages of the invention include systems, methods, and apparatus which provide one or more of the following:

a. a balancing of plural, sometimes competing, factors involved with EBT-type programs for the benefit of both EBT program participant and vendors of products under such programs;

b. the ability to automatically police compliance of which products the EBT-participant can purchase;

c. substantial flexibility in where it is applied, such as for example, embedded in vending machines that are either stand-alone and outside or are captive and inside a larger commercial establishment;

d. substantial flexibility and adaptability in how it is applied, such as integrated into vending machines which have both EBT eligible and EBT ineligible products, or just EBT eligible products;

e. efficiency in operation, such as operatively installed with vending machines so that owner/operators of the vending machines can relatively easily inform the vending machine of eligible versus ineligible products, automatically police vending of only eligible products to EBT card users, track and document (at least electronically) compliance, and track and inform inventory;

f. economy of scale such as allowing either one or many vending machines to operate under the techniques of the invention, such that entire fleets of vending machines owned and operated by an entity, but also fleets of vending machines by any number of unrelated entities, can take advantage of the foregoing types of advantages and functions;

g. reduction of cost and overhead for sellers of goods to EBT card holders including with respect to policing and proving compliance with EBT program rules;

h. ability to effectively and efficiently help sellers of goods to EBT card holders manage inventory and inventory control.

The present invention addresses the above-stated problem as follows.

In one aspect of the invention, instead of off-the-shelf, EBT-eligible products purchased at a POS card-reading machine, EBT-eligible products are loaded into a vending or automated merchandizing machine. The vending machine controller is programmed to recognize both an EBT card (as opposed to conventional debit/credit cards) and EBT eligible products, and automatically police that only EBT eligible products are vended to EBT card users of the vending machine. As a result, policing is automated and substantially relieved from the seller of the products. It also can automatically prevent either inadvertent or intentional non-compliance by the EBT card user.

In another aspect of the invention, policing of EBT program users is also possible. Automatic screening of users can be accomplished through requiring not only insertion of an EBT card into the vending machine card reader, but at least one identification or authorization code or information (e.g. private personal identification number (PIN)). This would promote integrity of use of the EBT card by only authorized EBT program participants.

In another aspect of the invention, automatic control of purchase quantity by EBT card users is possible. The owner-operator of the vending machine can pre-determine and program in a specific product quantity allowance. A card-user request for one or more of an EBT-eligible product is received and validated by the vending machine. The vending machine can deny any request that exceeds the pre-programmed quantity allowance for such a consumer, or limit the request to the allowance. For example, if the owner-operator limits each EBT card user to ten (10) baby formula cans per transaction (e.g. per transaction, per day, per week, per month, or otherwise), the vending machine will automatically limit each EBT card user accordingly. The limit could be pursuant to the EBT program rules or could be simply an owner-operator limit for the purposes of avoiding depletion of inventory of that product in the vending machine to the exclusion of other consumers.

In another aspect of the invention, the vending machine can monitor, document, report, and track inventory on a product-by-product basis or on more overall purchasing patterns, and use such data and information to inform the owner-operator of EBT-eligible stocking of products or other purposes.

In another aspect of the invention, a vending machine includes a vending machine controller (VMC) configured to read a food stamp or EBT card via some sort of appropriate reader. The vending machine controller is either programmed by product selection to know whether it is eligible or ineligible for dispensing under the SNAP food stamp program, or other EBT or analogous programs. Alternatively, if available, the VMC can communicate out to a data base in the vending machine network, the food stamp or other EBT program site, or at some other resource and check a selected product against the eligibility rules under SNAP or other EBT program. This latter configuration would promote being always up to date with present SNAP rules or other EBT program. In one example from existing information on the SNAP program or other EBT program, it is understood that UPC codes include information regarding type of food product. The vending machine controller could be preprogrammed to know or find out the UPC for each product selection it has stocked in its cabinet and check that against a data base of eligible classes of food products as published by the food stamp program.

In one aspect of the invention, a vending machine includes an EBT card or smart card reader. The vending machine controller is programmed to characterize items in the machine as either eligible or ineligible for use with the EBT card. The VMC is operatively connected to a vending machine network (e.g. via the internet or other wide area network) and/or a third party gateway or processor of electronic funds transfer. The vending machine controller reads the EBT card and product selection entered by the consumer via the vending machine keyboard and compares them to the food stamp program database for authorized cards and for sufficient credit on the card for the purchase, as well as compares it against the preprogrammed eligible/ineligible products. If any one of those factors needed to approve the vending machine transaction is not met, the transaction can be declined and the user informed via the vending machine display. If all requirements are met, the vending machine controller can vend the product and signal the gateway or processor such that the EBT card is debited the appropriate amount (as well as debiting the government account covering the card). Through conventional electronic funds transfer processing immediately or at some later time, appropriate credit to the vending machine owner/operators bank account through the internet is also given.

In another aspect of the invention, the vending machine controller can communicate out to some other source of information once an EBT card has been read and a user has selected at the vending machine. By comparing the product selection to some external database the VMC can make a determination if the selected product is eligible/ineligible under the SNAP or other EBT program regulations. If not, the transaction is denied at the vending machine. If it appears to be eligible, the transaction would proceed with the dispensing of the selected product or products, the debiting of the EBT holder's SNAP or other EBT program account, and the crediting of the vending machines owner's/operator's bank account.

In another aspect of the invention, a vending machine or kiosk can pre-qualify an authorized EBT type transaction as follows. A prospective user enters identifying information (e.g. a personal PIN) through a vending machine user-interface (e.g. keyboard). The VMC checks this information against an authorized EBT user list. If authorized, the vending machine now knows it is putatively dealing with a legitimate EBT participant. Optionally, the VMC can display to the user some indicia notifying the user an EBT transaction is validated and/or what limits the user has relative to EBT eligible products or allowances (e.g. limits on numbers of products). Now that the EBT transaction is authorized, the user keys in or otherwise enters a product(s) selection (one or more products and/or one or more of each product(s)). The VMC compares the user product order with the EBT program rules and/or the specific allowances. The VMC can indicate to the user a valid product order or otherwise proceed. The user is then prompted to swipe his/her EBT card or otherwise instruct a debit of his/her EBT account to consummate the transaction. The VMC can check that the account has sufficient credit, debit the account, and deliver or otherwise make available for access to the use the ordered product(s). In this way the vending machine can do a pre-authorization of a product order, make sure it has high confidence it is an authorized EBT user, make sure the order fits within its pre-programmed parameters, and then consummate with the debiting of the EBT account. This automation of the transaction carries with it automated compliance checks all along that process.

These and other objects, features, aspects, or advantages of the invention will become more apparent with reference to the accompanying specification and claims.

BRIEF DESCRIPTION OF THE DRAWINGS

FIGS. 4A, B, and C are examples of databases that can be used in the embodiment of FIGS. 3A-C.

DETAILED DESCRIPTION OF THE EXEMPLARY EMBODIMENTS OF THE INVENTION

A. Overview

Figure 1:
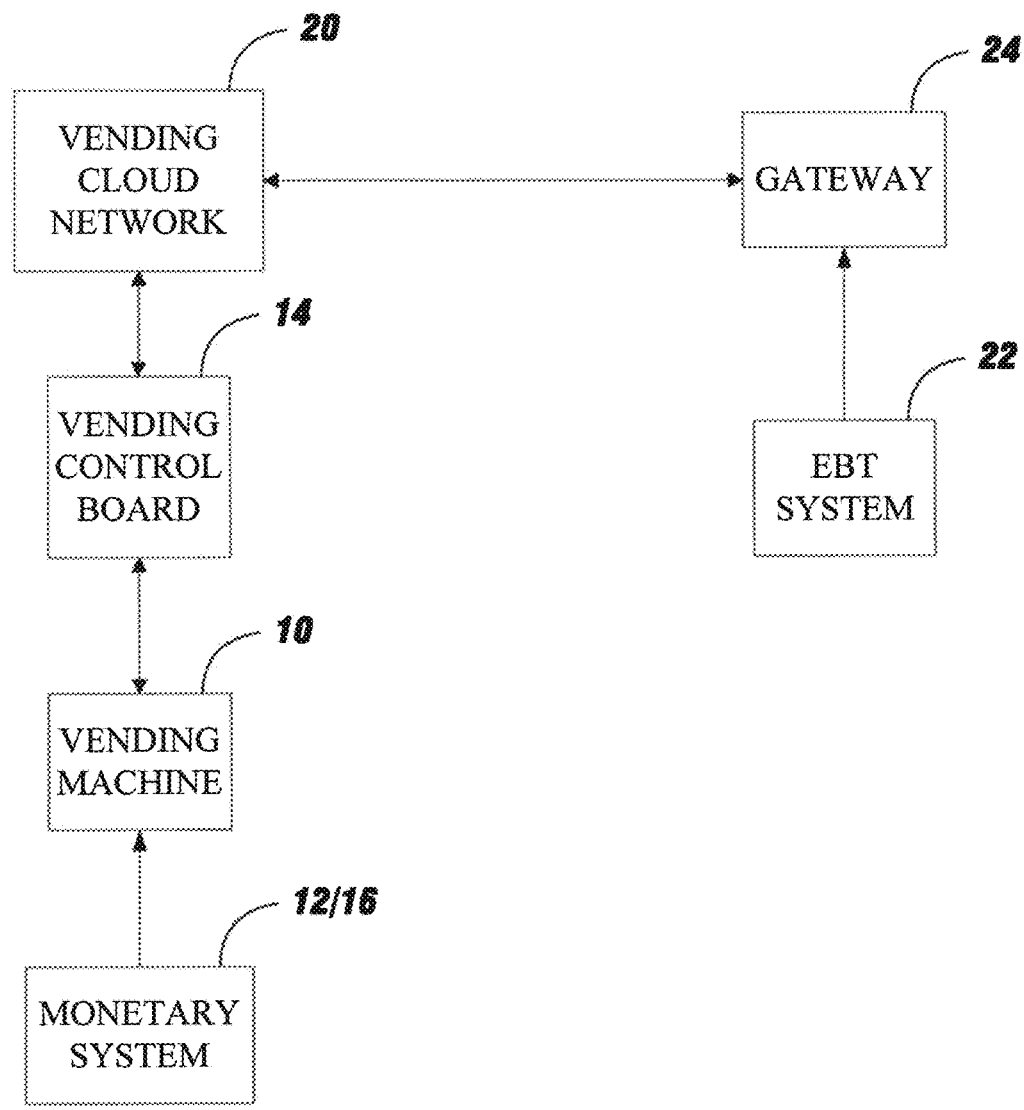
FIG. 1 is a block diagram of the high level scheme according to one exemplary embodiment of the present invention.
Figure 2:
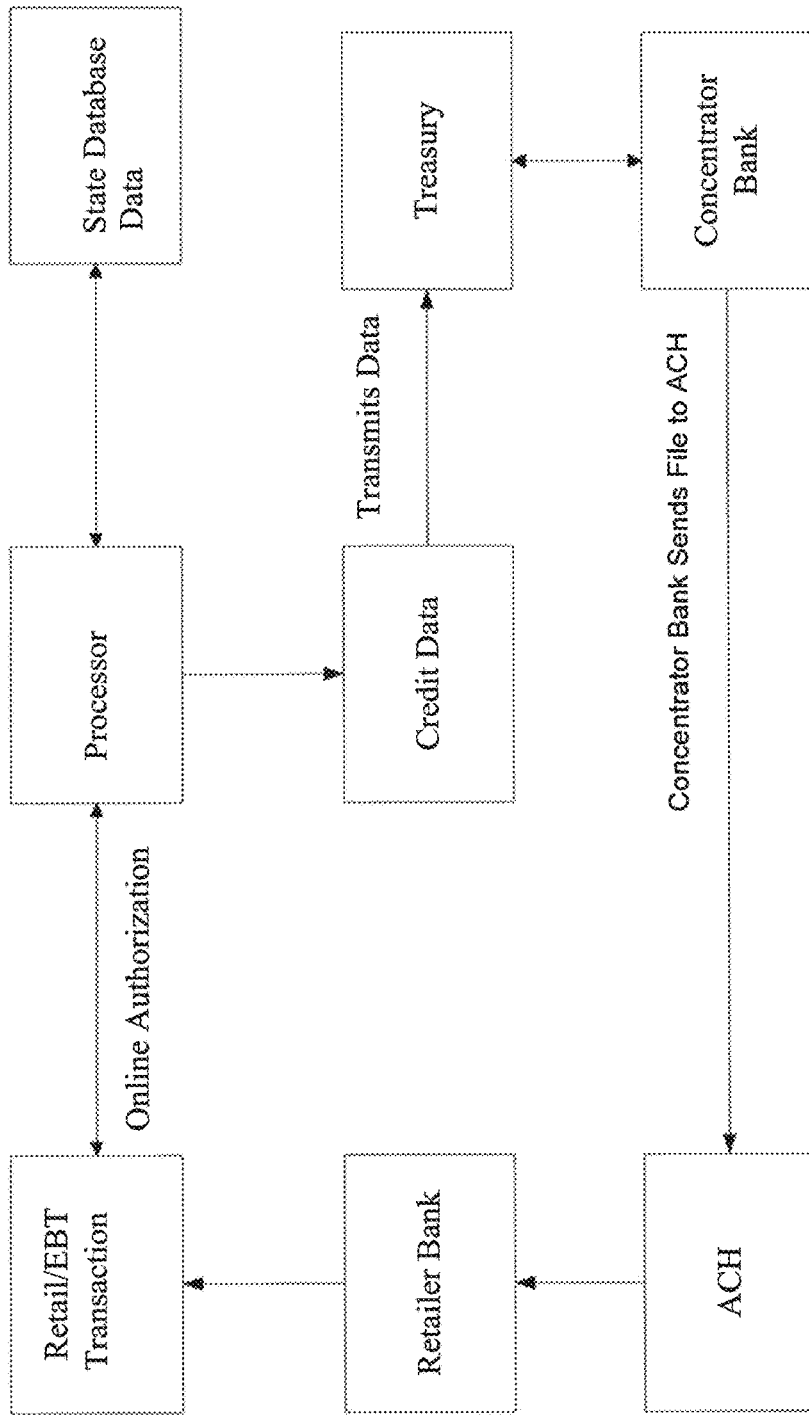
FIG. 2 is a high level block diagram of the gateway or processor handling of electronic funds transfer for the system of FIG. 1.

For a better understanding of the invention, several examples or embodiments of forms it can take will now be described in detail. It is to be understood that these examples are neither exclusive nor inclusive of all forms the invention can take, but illustrate some of those forms.

In this description, reference will sometimes be taken to the Figures which are summarized above. Reference numbers will indicate certain parts or locations in the drawings. The same reference numbers will indicate the same parts or locations throughout the drawings unless otherwise indicated.

The examples will refer to EBT programs. One example is the USDA SNAP program. Typical EBT programs issue a machine-readable card to qualified users. The card is linked to a government account having a replenishable monetary value according to the particular EBT program rules and the particulars of each user. The card is used to purchase products from vendors. It is to be understood that these programs are given by example only and that the invention can be applied in analogous ways to analogous programs.

The examples will refer to vending machines (sometimes alternatively referred to as automated merchandizing machines). Typical vending machines have the following primary sub-systems. First, a cabinet to store an inventory of vendible products, see FIG. 3 and, e.g., Model MP40 Snack Merchandiser commercially available from Fawn Vendors, Clive, Iowa (USA). Second, a user interface allowing consumer selection of one or more vendible products. Third, a validator which confirms some form of credit from the consumer commensurate with the consumer-selection(s) (e.g. bill/coin validator, credit/debit card reader and validator, token or coupon reader/validator). Fourth, one or more dispensing mechanisms to dispense the selected and validated products to the consumer. And fifth, some sort of programmable controller (e.g. vending machine controller or VMC) which communicates between and controls operation of the validator, consumer user-interface, and dispenser(s).

Details about how such sub-systems interact to vend products are described at U.S. Pat. No. 7,810,721 and published applications U.S. 2006/0106490 and U.S. 2002/0156727, which are incorporated by reference herein. There are several industry standard communications protocols allowing cooperation of validators, dispensers, and VMCs of different types and manufacturers. Such vending machines have been around for decades and are well-known in the art and available from a variety of manufacturers. An example of such a vending machine is the Fawn Model MP40 snack vendor. It is to be appreciated that any of a wide variety of vending machines can be utilized with the concepts of these embodiments. For example, other examples of vending machines that might be applicable include beverage dispensers, sandwich and fresh food dispensers, frozen food venders, as well as others.

More recently, a sixth possible sub-system of vending machines is a communication module which allows the VMC to communicate externally. One example is with other vending machines (e.g. master/slave arrangements). Another is to a communication network (e.g. LAN or WAN). One example of a WAN is the Internet. This allows a set of VMCs to report to and receive instructions or information from a remote source (e.g. a remote server or computer). U.S. Pat. No. 7,810,721; U.S. 2006/0106490; and U.S. 2002/0156757 give details regarding the programmability, the communications protocols, and the communications subsystems which allow vending machines to communicate out to a vending machine network via the internet or other LANs or WANs. Some of these patent filings also specifically describe how card readers with vending machines work and how they can communicate with card issuers or electronic fund transfer processors or gateways for processing cashless vending machine transactions.

One use of an Internet connection is for a vending machine operator to stay in touch with plural vending machines in terms of such things as sensing when inventory is low and restocking is needed, accounting purposes, and the like. Another use is to monitor whether the vending machine is operating properly (e.g. monitor for error conditions or malfunctions to allow a service call to be ordered or made). It is to be appreciated that vending machine controllers, and communications to networks and third parties is well known in the art. Therefore, it will be understood that the examples of vending machines given in this description are illustrative only and that the invention can be applied in analogous ways to analogous machines.

The following examples will focus on food stamp EBT type cards and programs. However, it is to be understood that the invention can apply to other EBT or analogous cards or programs.

B. Example Apparatus

With reference to FIGS. 1-4C, a first exemplary embodiment according to the invention is illustrated and will be described below.

Figure 3A:
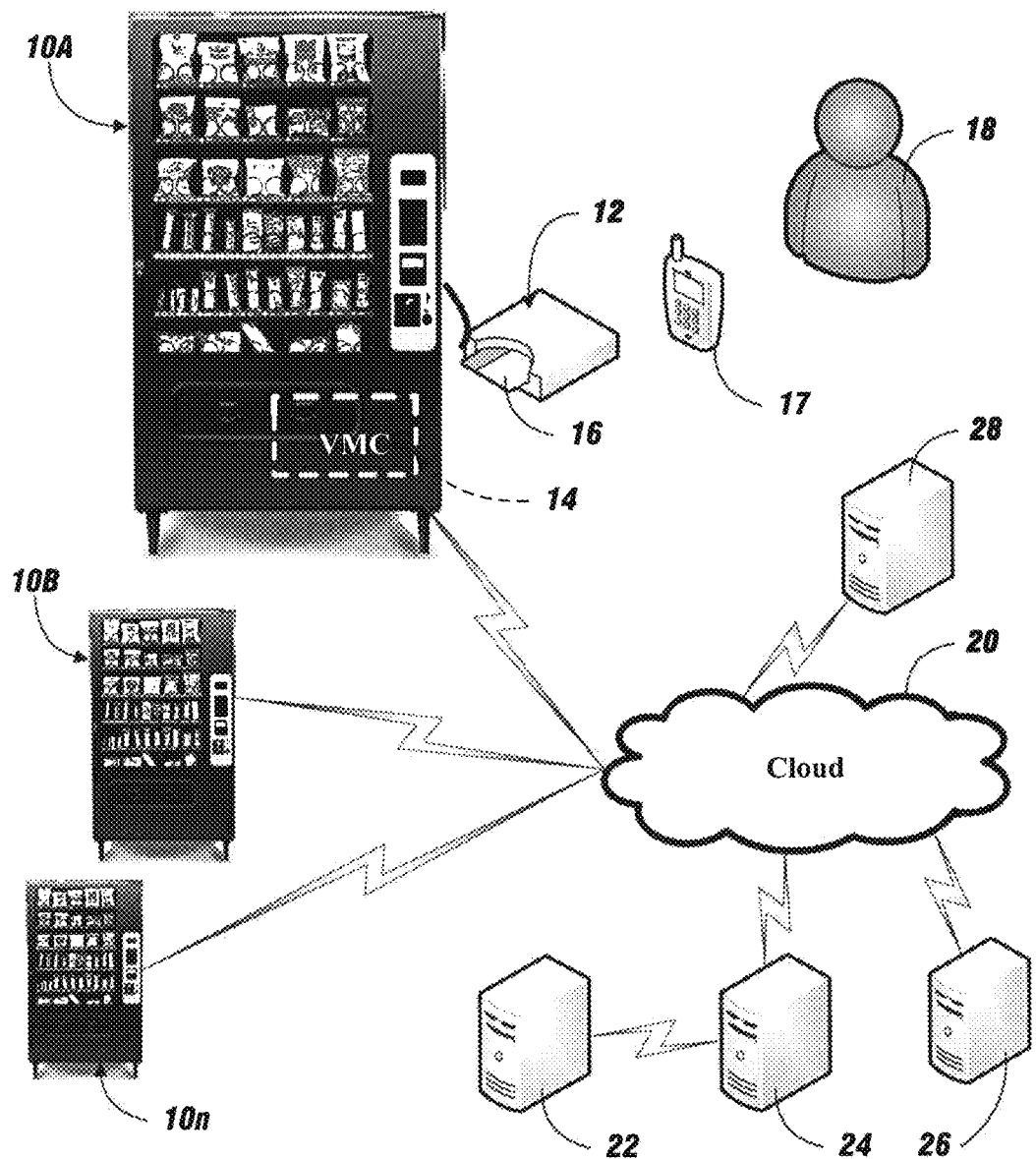
FIG. 3A is a schematic diagrammatic depiction of a specific exemplary embodiment according to the present invention following the more generalized concepts of FIGS. 1 and 2.

A vending machine 10 such as Fawn Vendors Model MP40 is configured with an EBT card or smart card reader 12 (see FIG. 3A—would typically be installed inside vending machine 10). A VMC 14 is programmed with information from which can be derived whether or not any product stocked in the vending machine is eligible for use with the SNAP program EBT card or smart card 16.

For example, the EBT card or smart card 16 can include information such as shown at the database table of FIG. 4A. On the magnetic strip typical for such cards could be the name of the household or cardholder 18 that has been approved for the SNAP benefit, a card number or other unique identifier, the state issuing the card, the address of the authorized user or household, and a current balance of monetary value on the card. As is well known in the art, the card can be a "smart card" in which a readable and writable chip on the card can store such information including changeable current balance carried on the card. On the other end, it can simply include identifying information and, when confirmed in a card reader, communicate out to either food stamp system database or the gateway or third party processor (if that information is stored there) and instigate a transfer back to the vending machine of the current balance of that account. As indicated in FIG. 3A, instead of a card reader, device 12 could be a wireless reader of EBT information from a smart phone 17 or other similar payment system.

As is also conventional with many debit or credit cards, the holder of the card could also have a unique identifier that is needed to initialize use of the card. One example is a personal identification number or PIN.

In this embodiment the card reader 12, through the VMC 14, allows communication or verification of (1) is the card an authorized card under the SNAP program? (2) is there positive value in and what the precise amount is in the account?Conventionally, the first step requires not only reading of the card but also user entry of a personal identification number (PIN) which can be done through the keyboard of the vending machine. Such a keyboard can be a manually-operable keyboard or otherwise (e.g. a touch screen).

The basic operation of the SNAP EBT card program is well known. Details regarding the same can be found in the articles listed in the table below, which are incorporated by reference.

---

"Electronic Benefit Transfer", Wikipedia, the free encyclopedia, Aug. 21, 2013, pgs. 1-3.
"Electronic Benefit Transfer", FoodStamps.org, 2013, 1 pg.
"Food and Nutrition Act of 2008", Q:/Comp/FNS/FNA08, Oct. 1, 2008, pgs. 1-57.
"Supplemental Nutrition Assistance Program", USDA, Jul. 25, 2013, pgs. 1-5.
"SNAP The Supplemental Nutrition Assistance Program", USDA, May 2012, pgs. 192-207.
"Electronic Disbursement Options", NACHA—The Electronic Payments Association, November 2003, pgs. 1-23.
Quinones, et al., "From Paper to Plastic by 2002: Retailers' Perspective on Electronic Benefit Transfer Systems for Food Stamps", Working Paper 00-06 The Retail Food Industry Center University of Minnesota, August 2000, pgs. 1-20.

---

Specific details of these references include the following:
  Electronic Benefit Transfer (from Wikipedia and from FoodStamps.org) gives a high level overview of EBT processing and protocol.
  Food and Nutrition Act of 2008 provides a copy of the federal law regarding the SNAP program and utilization of the EBT cards.
  Supplemental Nutrition Assistance Program describes in detail eligible and ineligible food items and how they are handled by the SNAP program.
  SNAP The Supplemental Nutrition Assistance Program is a training guide for retailers that decide to accept the EBT SNAP cards (it is not mandatory). It includes specific details of how a retailer must apply for and be granted permission to participate and the types of criteria to gain permission. Food and Nutrition Act of 2008, Supplemental Nutrition Assistance Program, and SNAP The Supplemental Nutrition Assistance Program also discuss how retailers must police the appropriate use of the cards.
  Electronic Disbursement Options and From Paper to Plastic by 2002 give additional specific details about how the EBT cards work with the government food stamp system (see, e.g., FIG. 2 and FIGS. 3A and B) and a gateway or third party processor 24. In particular, From Paper to Plastic by 2002 sets forth parts of the diagram of FIG. 2 at its page 9. It gives details regarding how a gateway or third party processor 24 actually debits and credits the appropriate parties for each authorized SNAP EBT card transaction.

As previously stated, a typical vending machine would not be able to automatically determine if a stocked product is eligible for use with the SNAP card. Thus, an attempt to use the card risks either being declined as not recognizable to the VMC or allow the vending of a product that is ineligible under SNAP.

A first solution to this problem under this embodiment is as follows. The vending machine owner or operator (or the parties stocking the vending machine) conventionally programs the VMC not only to know what product is in what row and column position relative to key pad selection by the customer, but also can set a specific price or provide other information regarding that product. The owner/operator could add a code or other data whether or not each product is eligible under the current SNAP rules. This could be at each individual vending machine 10 (by programming techniques and interfaces well-known in the art) or via a centralized communication with one or more vending machines (e.g. a vending machine owner/operator server 26 such as FIG. 3A, or an owner operator central server 28 in FIG. 3A). Note how an owner/operator or other entity could control plural vending machines 10A, 10B, . . . , 10n (see FIG. 3A) either individually and locally or centrally and remotely (e.g. by commercially available systems well known in the art that allow two-way communication between a central computer and each VMC/vending machine over, for example, Internet or other networks). Supplemental Nutrition Assistance Program (cited above) gives information about what is eligible and ineligible. The VMC would then automatically decline any attempt to vend an ineligible product (as programmed into the VMC) even if attempted by an EBT cardholder that has a valid SNAP card and positive balance or otherwise meets authorization of the database at FIG. 4A. This would allow the vending machine to automatically not only police attempts to use the EBT card for ineligible products but would allow the vending machine owner/operator to show any government entity that it had a policing program in place. While this does take some work by the vending machine owner and operator, it allows that owner or operator to control its policing and allows the vending machine to automatically do such policing.

Alternatively, as indicated at SNAP The Supplemental Nutrition Assistance Program (cited above), many conventional point of sale retail machines can be programmed to separate SNAP eligible and ineligible items. That same programming could occur at a vending machine VMC. One suggested way this occurs is that UPC codes on food products scanned at, for example a grocery store bar code scanner, would be compared against a database of eligible food item categories. See, for example, FIG. 4C. If the VMC refers to that database, it can use that as a comparison for denial or approval of a vend at the vending machine based on UPC category of food items.

It is to be understood, that other manners of deriving what is SNAP eligible or ineligible are possible.

If it is selected to refer out to some database maintained by the food stamp program, this would allow the vending machine owner and operator to reduce the burden of individually programming each vending machine for each stocked item.

It would also keep what is eligible or ineligible current with the current food stamp program regulations.

Other ways to correlate what is eligible or ineligible in the vending machine under the SNAP Program are possible.

Therefore, the apparatus or system according to the specific embodiment would include a programmable vending machine controller, an EBT card or EBT smart card reader, and a communication system to communicate through a network to a gateway for the food stamp system. See FIGS. 4A-C.

C. Example Operation 1

Figure 3B:
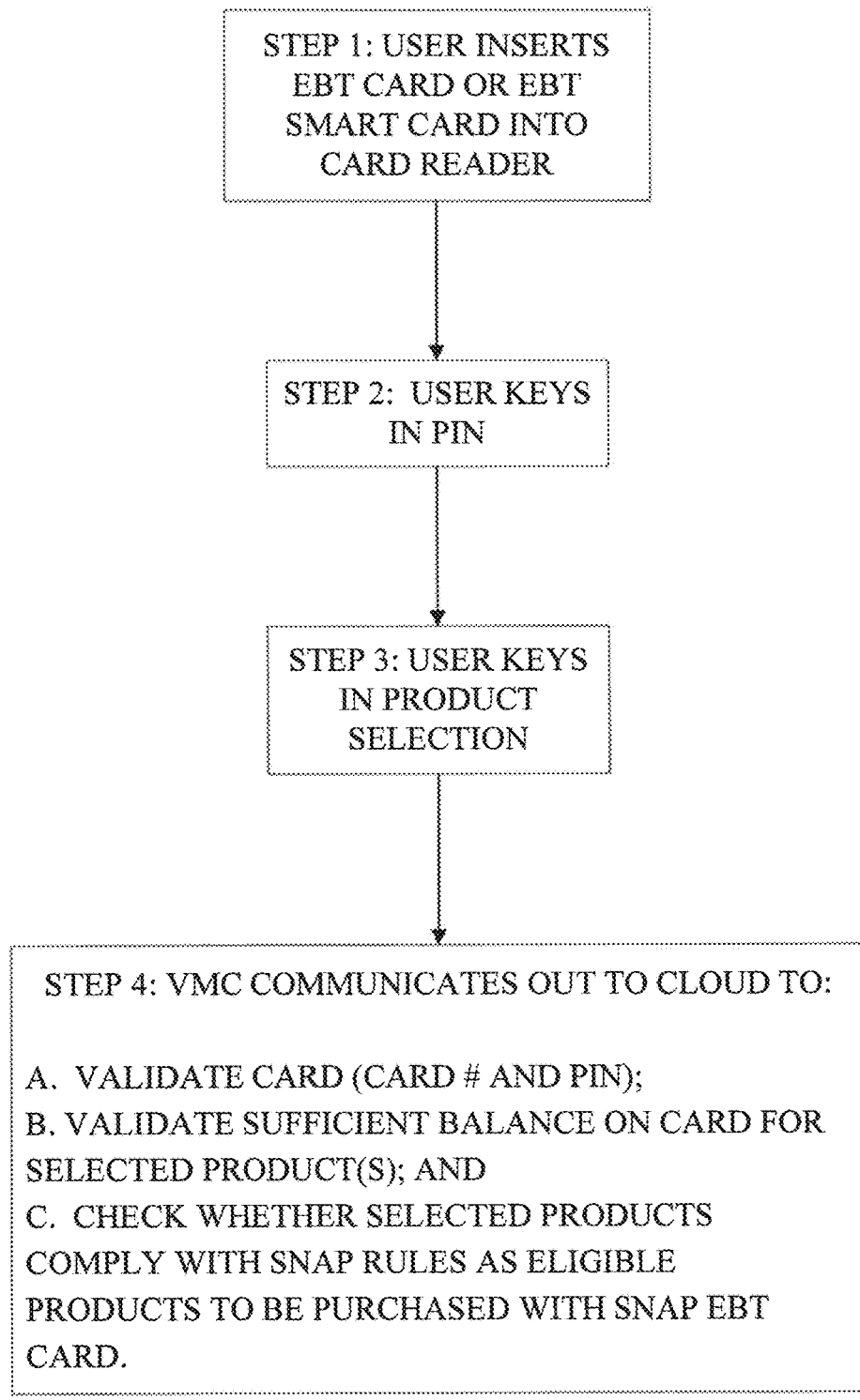
FIG. 3B is a block diagram of one example of a method of use of the system of FIG. 3A according to one aspect of the invention.

By reference to FIGS. 1-4A to C and the cited references, and in particular to FIG. 3, the system or apparatus of FIGS. 3A and B could be operated as follows.

Step 1: A user inserts the EBT card or EBT smart card 16 into the card reader 12 of the vending machine 10.

Step 2: The user keys in his/her PIN via the vending machine keyboard.

Step 3: The user keys in a product selection (this can be one product or in some machines multiple products).

Step 4: The VMC 14 communicates out to the cloud or Internet 20 (or other communication network(s)) information read from the card 16 and the PIN (e.g. table of FIG. 4A) and compares it to a database such as at FIG. 4B. See also food stamp (SNAP) or EBT database 22 in FIG. 3A. This allows the vending machine 10 to validate the card 16 is authorized by comparing the individual's card information to the food stamp system master database of authorized cards (FIG. 4B). But additionally, the VMC 14 would compare the product selection entered to criteria from which can be derived whether or not the selected product or products are eligible or ineligible under food stamp program regulations.

Also, the VMC 14 could check against either account balance information carried on the card or against the database associated with the card accessible through the network to see if the card carries enough credit to make the selected product purchases.

If any of the above criteria does not check out, the transaction would be declined. This could be displayed on a display on the exterior of vending machine 10 (e.g. a typical display at or near the keyboard, such as alpha-numeric LCD segment displays, video displays, touch screen displays, or other). Or the card could merely be ejected or no action taken by the vending machine 10.

If all the criteria described above are met, the VMC 14 would instruct dispensing components of the vending machine 10 to dispense the product or products that have been shown to be eligible under SNAP and affordable under the account balance of the cardholder 18. Then, through a gateway or third party processor, the VMC can signal an approved transaction, and the amount of the transaction. This can set off a process by which the card user's account is debited the appropriate amount and the vending machine owner or operator's bank account is credited the appropriate amount. Either at that point in time or in due course according to the gateway or third party processor, the government bank account with the account balance of the cardholder is debited and the vending machine owner operator bank account is credited.

In this manner, the account balance of the cardholder is updated on each approved transaction. As indicated at the database of FIG. 4B, the many thousands of SNAP cardholders can have running, updated accounts in this manner. As indicated in certain of the cited references, the food stamp program can make automatic monthly or other periodic deposits into each of those accounts according to the approved eligibility of each authorized cardholder or household. As can be appreciated, these amounts vary from cardholder to cardholder and from state food stamp administration program to state program.

D. Example Operation 2

A specific implementation of aspects of the invention will now be described in the context of a stand-alone kiosk type machine such as might be found in a public space (such as inside a shopping mall corridor, outside a retail or other business establishment, or inside a retail establishment). It can have the attributes of a typical vending machine (such as the typical components described regarding the Example Apparatus above). It can have the structure of a typical vending machine (e.g. stand-alone relatively small foot print moveable cabinet with lockable interior with dispensers, VMC, etc.). Alternatively, it can be more of a built-in case (similar to an in-wall frozen or refrigerated food glass-front grocery store display case) but with lockable doors, a controller that functions like a VMC, and a card reader (or alternative). It could have dispensers. Some could merely have the controller unlock a door to allow consumer-access to inventory on shelves or the like. Alternatively it could take the form of a self-service kiosk in a consumer-accessible location (e.g. inside, outside, or otherwise at or around a shopping mall, grocery store, department store, government building).

Using techniques similar to discussed above, this configuration (sometimes called Controlled Access System) could operate as follows. See FIG. 3C.

The Controlled Access System is a software solution that instantly manages a vending kiosk transaction to allow the use of government assisted programs such as EBT. This could be done by identifying the transaction, and then assigning specific product allowances to a unique consumer based off applied credentials identified by the vending kiosk administration per the government approved qualifications. The transactions are then cataloged, time-stamped to provide instant reporting and tracking of the current vending kiosk product, and overall consumer usage for that specific location. Controlling, monitoring the inventory, and maintaining the vending kiosk health is completed by specified administrative users.

The Controlled Access System empowers government assisted consumers to instantly have access to the vending kiosk product through PIN number to identify the session as an EBT transaction, and to then complete the transaction using a government issued EBT card using an attached card reader. If a consumer is not registered through a government assisted program the system allows them to purchase product through an attached card reader using a credit card processing platform. Additional administrative notifications can be setup to manage every time a controlled product is dispensed, and the current level of product in the vending kiosk to insure the machine meets government qualifications.

Figure 3C:
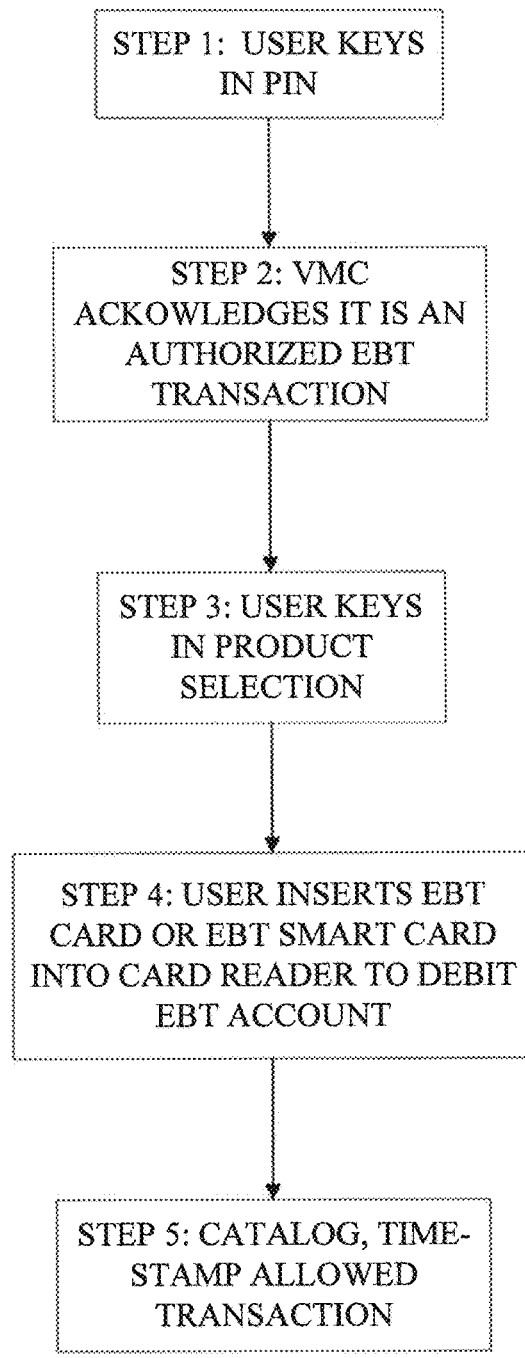
FIG. 3C is a block diagram of an alternative method of use of the system p according to another embodiment of the invention.

As set forth in FIG. 3C, this embodiment could function as follows.

A vending machine or kiosk can pre-qualify an authorized EBT type transaction as follows. Step 1: A prospective user enters identifying information (e.g. a personal PIN) through a vending machine user-interface (e.g. keyboard). The VMC checks this information against an authorized EBT user list. If authorized, the vending machine now knows it is putatively dealing with a legitimate EBT participant. Step 2: Optionally, the VMC can display to the user some indicia notifying the user an EBT transaction is validated and/or what limits the user has relative to EBT eligible products or allowances (e.g. limits on numbers of products). Step: Now that the EBT transaction is authorized, the user keys in or otherwise enters a product(s) selection (one or more products and/or one or more of each product(s)). The VMC compares the user product order with the EBT program rules and/or the specific allowances. The VMC can indicate to the user a valid product order or otherwise proceed. Step 4: The user is then prompted to swipe his/her EBT card or otherwise instruct a debit of his/her EBT account to consummate the transaction. The VMC can check that the account has sufficient credit, debit the account, and deliver or otherwise make available for access to the use the ordered product(s). In this way the vending machine can do a pre-authorization of a product order, make sure it has high confidence it is an authorized EBT user, make sure the order fits within its pre-programmed parameters, and then consummate with the debiting of the EBT account. This automation of the transaction carries with it automated compliance checks all along that process. Step 5: Optionally, the system can catalog, time-stamp, and otherwise document, store, or utilize data about the authorized and consummated transaction. This includes monitoring plural such transactions by plural users, at plural machines, and/or networks of machines.

As can be appreciated, this mode of operation has benefits for both EBT participant and EBT program vendor. This mode of operation achieves at least some of the objects, features, aspects, and advantages outlined earlier.

The EBT participant can avoid inadvertent use of the EBT card for EBT ineligible products. The EBT participant can use the card in discrete ways. The EBT participant can have a readily-identifiable location for repeat purchases.

The EBT vendor can automatically police compliance with EBT rules. The EBT vendor can track, document, record, and analyze EBT product purchases for showing compliance with EBT rules, managing inventory, and other purposes. One subtle but potentially valuable aspect is the further ability to pre-program a maximum allowed quantity of one or more EBT eligible products per EBT participant. One example is to avoid one consumer to buy up the complete inventory of a product from the vending machine. The VMC could be programmed to limit a consumer to a maximum number of a certain EBT eligible product in the vending machine. Even if the consumer asks for more, the machine either denies the order (and/or requires amendment of the order to within the limit), or automatically changes the order to be within the limit. This helps prevent exhaustion of a certain product from the machine by one consumer transaction. This can benefit subsequent EBT consumers, who might rely on that vending machine for important, urgently needed items. This can benefit the vending machine owner/operator who may not be able to restock frequently and/or does not want disappointed potential customers arriving and finding a desired product out-of-stock. It can also benefit the owner/operator in situations where non-EBT consumers want the same product. This can, in some circumstances, be a higher-profit-margin sale than with EBT consumers.

As can be further appreciated, this mode of operation allows other control of what potential customers are offered. The controlled-access vending machine (cabinet, kiosk, case, etc.) can be stocked with EBT-eligible products only. But it could also be stocked with both EBT-eligible and EBT-ineligible products. In either case, the machine could control which and how many of any product would be allowed based on whether the consumer establishes EBT eligibility (e.g. by recognized EBT card and PIN) or not. But also whether or not the consumer orders products in an allowed number.

This mode of operation balances a number of factors and policies surrounding both EBT-type programs and participants, as well as factors and policies of the vendor of the products.

For example, instead of relying on a clerk at the POS card reader/register to manage an EBT transaction, the retail establishment (e.g. grocery store) might install a vending kiosk of the type here described inside its store. This moves policing of EBT purchases, and indeed, the entire transaction, to the substantially automated kiosk. It also allows each store owner to balance and implement its interests, within the rules of the EBT program. This might include, for example, the limitation on allowed number of products that can be purchased from the kiosk.

E. Example Operation 3

This control by the owner/operator of the vending kiosk can take many forms. The foregoing example concentrates on limiting the number of a specific product that can be taken from the kiosk in one transaction. It is to be understood that the control can be based on a maximum amount per transaction. This could allow a consumer to make successive transactions at the same kiosk, and exhaust a product inventory that way. Therefore, as can be appreciated by those skilled in the art, the VMC or equivalent of the kiosk could limit purchases not just by quantity per transaction, but other ways. One example would be a time limitation. Because the VMC knows which particular card is being used, it can limit not only number per transaction, but also limit cumulative purchases over a time period—for example, no more than the maximum in any one week period. It could also limit by time of day, month, etc. These limits could vary by time of year, past purchase history, or other parameters, according to need or desire of the vending machine owner/operator. Another example is limiting by product type or types per transaction or over time or based on some other limiting parameter. In one case it could be that a particular EBT cardholder would be limited to a certain subset of food products.

As can be appreciated by those skilled in the art, the programmability of most VMCs and similar controllers allows high flexibility. But, again, because the VMC can discriminate between EBT cards (e.g. by information carried on the card, or linked to the card, and/or additional information like a PIN), the VMC can be programmed to apply certain limitations to that card. Such programming is within the skill of those skilled in the art of vending machines and VMCs.

As can be appreciated, aspects of the invention allows the vending machine to function at many levels of purchasing. Because the vending machine will typically have a locked cabinet or inventory space, the system deters shop-lifting, theft, or other manipulation of the inventory. And the ability to monitor inventory flow by purchaser, at least those with EBT cards, adds to such flexibility, both from the consumer and owner/operator standpoints.

As is further understood, much of the control can be with back end software. This is highly efficient. Examples of systems that can monitor and control inventory based on identifying a particular user of the machine in a different context are described at U.S. Pat. No. 7,991,507 and US2013/0253700, each of which is incorporated by reference herein. As can be appreciated, the present embodiments can increase integrity of the transaction by requiring at least two types of identification by the consumer. For example, the EBT card itself can be one form. A PIN can be another. Others are possible.

F. Options and Alternatives

The foregoing is but one example of how the invention might be implemented. It is to be understood that it can take different forms and embodiments. Variations obvious to those skilled in the art will be included within the invention and the above examples are neither inclusive nor exclusive of all forms it can take.

For example, the foregoing suggests several ways in which a SNAP benefits or other EBT program holder can be authorized to select eligible products from a vending machine with an EBT card or EBT smart card. An alternative can be utilizing a device such as a smart phone by the account holder as the input device to ask for validation of a transaction at the vending machine. As shown in FIG. 3A, a smart phone 17 would allow communication with the cloud or network 20. The card holder 18 enters a user identification and PIN at a website that would then communicate with the vending machine controller 14 and gateway 24 to see if that data matches. Examples of smart phone user input to a vending machine can be seen at U.S. 2004/0210486 and U.S. 2012/0226565 which are incorporated by reference herein. If authorized under the SNAP Program (or other EBT program), this could be a secure way to allow instigation of an attempt to purchase an eligible food product from a vending machine. There are still further possible alternatives that would have to be checked against SNAP (or other program) regulations. Again the embodiments are applicable to other analogous programs including other EBT programs. Those skilled in the art understand that there can be a variety of such programs. Even food stamp programs may have variations from state to state and can be called out under different names. There are programs like WIC (women, infants, and children), and other federal or state or analogous programs can have relevance to the invention.

There are different ways of processing the request. In the foregoing embodiment, a gateway or third party processor might be used. It could be either a nongovernment private third party (an example would be Quest by NACHA—The Electronic Payments Association, Herndon, Va. (USA). It is possible the gateway could be a direct connection to the food stamp program or another type of processor.

A still further option or alternative would be to integrate the request for SNAP or other benefit card purchases at vending machines for vending machine monitoring and accounting purposes. There are a variety of known or available vending machine monitoring software systems that can communicate vending machines to a vending machine network. For example, a central server 28 could be utilized to monitor a number of vending machines VM1, VM2, . . . VMn (see FIG. 3A). Each attempt to consummate a vend at any of those vending machines could be sent via the Internet 20 to the vending machine network or server. It could keep track of denied versus approved transactions. It could keep track of what products are vended. This can be used for inventory management. It could keep track of SNAP or other program purchases versus non-SNAP or other EBT purchases. The owner/operator can be informed at the central server computer that a vending machine needs to be restocked. It can also keep track for accounting purposes of the monetary amounts and other things. Such functions are known in the art.

Another option or alternative would be an automatic or periodic updating of on-board VMC databases or accessible external databases regarding any of the information needed for these types of transactions including current updates on what is ineligible or eligible for the SNAP or other analogous program.

What is claimed is:

1. A system for obtaining items under an electronic benefits transfer (EBT) program, comprising:
   a. a vending machine (VM) or Controlled Access System (CAS) comprising a lockable cabinet with interior inventory space with an electrically or electronically controllable lock with plural locations to stock vendible products, a window to view the interior inventory space, a VM or CAS controller, and a user input interface, wherein
      i. the cabinet and window enclosing a plurality of dispensing actuators arranged in rows and columns vertically in the cabinet or inventory space, each dispensing actuator being individually addressable to serially dispense a stocked vendible product associated with it by row and column identity,
      ii. the vendible products comprise an inventory of both products eligible for the EBT program and products ineligible for the EBT program, the products eligible for the EBT program stocked relative to dispensing actuators preprogrammed by dispensing actuator row and column in the VM or CAS controller to correlate to products eligible for the EBT program and the products ineligible for the EBT program stocked relative to other dispensing actuators preprogrammed by dispensing actuator row and column in the VM or CAS controller to correlate to products ineligible for the EBT program so that the VM or CAS controller allows both product orders by authorized EBT program users and non-EBT program users;
   b. a software program in operable communication with the VM or CAS controller, the software program comprising controlled dispensing from the locked cabinet interior inventory space of the products eligible for the EBT program by:
      i. requiring a user identification protocol to identify a user as authorized under the EBT program;
      ii. a user allowance protocol to inform the user an authorized EBT transaction can commence;
      iii. a product identification comprising a prompt to the user generated automatically from the VM or CAS controller to enter a product order by column and row via the user input interface;
      iv. a check for compliance conducted automatically by the VM or CAS controller of the product order with allowances pre-programmed for the user and product location of the VM or CAS that correlates with a product or products eligible for the EBT program;
      v. a prompt to the user generated automatically from the VM or CAS controller to validate the product order with a swipe of an EBT machine-readable card or wireless data input from a smart phone application via the user input interface;
      vi. a debiting of the EBT account generated automatically from the VM or CAS controller based on the product order if the product order is within the allowance pre-programmed for the user;
      vii. wherein the software program further comprises a protocol to monitor, track, catalog, store, document, and/or notify another device based on one or more user transactions at the VM or CAS for both tracking of inventory of vendible products and documentation for EBT program compliance.

2. The system of claim 1 wherein the software program is on-board the vending machine.

3. The system of claim 1 wherein the software program is off-board the vending machine at a back end processing device.

4. The system of claim 1 wherein the user identification protocol comprises comparison of identifying information associated with a card machine-readable automatically by the vending machine.

5. The system of claim 4 wherein the user identification protocol further comprises a personal identification number (PIN).

6. The system of claim 1 wherein the pre-programmed limitation is a maximum allowance of a specific vendible product.

7. The system of claim 6 wherein the maximum allowance is further limited by user, number, time period, and/or type of product.

8. A method of facilitating EBT transactions comprising:
a. providing an inventory of EBT-eligible and other products in product locations comprising a lockable cabinet with inventory space with an electrically or electronically controllable lock in a vending machine (VM) or Controlled Access System (CAS) with a window to view the interior inventory space, each product location designated for an EBT-eligible product or for a said other product;
   i. the cabinet and window enclosing a plurality of dispensing actuators arranged in rows and columns vertically in the cabinet or inventory space, each dispensing actuator being individually addressable to serially dispense a stocked vendible product associated with it by row and column identity;
   ii. the vendible products comprise an inventory of both products eligible for the EBT program and products ineligible for the EBT program, the products eligible for the EBT program stocked relative to dispensing actuators preprogrammed by dispensing actuator row and column in the VM or CAS controller to correlate to products eligible for the EBT program and the products ineligible for the EBT program stocked relative to other dispensing actuators preprogrammed by dispensing actuator row and column in the VM or CAS controller to correlate to products ineligible for the EBT program so that the VM or CAS controller allows both product orders by authorized EBT program users and non-EBT program users;
b. discriminating between EBT-authorized and other users of the VM or CAS;
c. for EBT-authorized users, automatically discriminating between the EBT-eligible products and the other products, wherein the discrimination of the EBT-eligible and the other products is by reference to a database associated with an EBT program and designated product location in the VM or CAS by row and column;
d. automatically dispensing EBT-eligible products to an EBT-authorized user of the VM or CAS upon automatically checking whether the user is within a preprogrammed limitation on purchase associated with a user.

9. The method of claim 8 wherein the discrimination of EBT-authorized users is by two forms of identifying information.

10. The method of claim 9 wherein the two forms of identifying information comprise:
a. machine-readable information;
b. a PIN.

11. The method of claim 8 wherein the EBT program is USDA SNAP.

12. A system for obtaining items from a vending machine (VM) or CAS under a food stamp or other electronic benefits transfer (EBT) program, comprising:
a. a VM or CAS with one or more vendible products stocked in product locations comprising a normally-locked cabinet or inventory space defined by an interior and a window to view the interior, and an electrically or electronically controllable lock, a monetary system for validating sufficient credit in a user's EBT program account for purchase under an EBT program, a VM or CAS controller, and a user input interface;
   i. the cabinet or inventory space and window enclosing a plurality of vendible product locations arranged in rows and columns vertically in the cabinet or inventory space, each vendible product location being individually addressable to correlate a stocked vendible product at each vendible product location by a cabinet or inventory space identity;
   ii. the vendible products comprise an inventory of both products eligible for the EBT program and products ineligible for the EBT program, the products eligible for the EBT program stocked relative to the vendible product locations preprogrammed by the cabinet or inventory space identity in the VM or CAS controller to correlate to products eligible for the EBT program and the products ineligible for the EBT program stocked relative to other vendible product locations preprogrammed by cabinet or inventory space identity in the VM or CAS controller to correlate to products ineligible for the EBT program so that the VM or CAS controller allows both product orders by authorized EBT program users and non-EBT program users;
b. a communications module in the VM or CAS to communicate to a wide area network;
c. a gateway, third party processor, and/or EBT program system communicable with the wide area network;
d. a software program to automatically derive and communicate to the VM or CAS controller (i) whether a user's attempt via the user input interface to vend a selected product is authorized under the EBT program, (ii) whether sufficient credit is associated with the EBT program account, and (iii) whether or not the selected product in a vendible product location is eligible or not under the EBT program, and (iv) controlled automatic unlocking of the locked cabinet or inventory space or automatic dispensing from the locked cabinet or inventory space, wherein information regarding eligibility of a vendible product under the EBT program is contained onboard the vending machine or CAS, or in an external and accessible database accessible by the software.

13. The system of claim 12 wherein the EBT information is contained on a machine-readable card, a smart card, or a smart phone or device.

14. The system of claim 12 further comprising utilizing information regarding the attempted transaction by a vending machine (VM) and/or CAS network to keep track of inventory, credits, debits, and other information for one or more of a plurality of VMs or CASs.

15. The system of claim 12 in combination with a network of a plurality of other vending machines (VMs) or CASs.

* * * * *